United States Patent
Shachaf et al.

(10) Patent No.: US 11,551,243 B2
(45) Date of Patent: Jan. 10, 2023

(54) SYSTEMS AND METHODS FOR FINDING AN INTERACTION SUBSET WITHIN A SET OF INTERACTIONS

(71) Applicant: Nice Ltd., Ra'anana (IL)

(72) Inventors: Yuval Shachaf, Netanya (IL); Gennadi Lembersky, Nesher (IL); Roy Klein, Rishon Lezion (IL)

(73) Assignee: Nice Ltd., Ra'anana (IL)

( * ) Notice: Subject to any disclaimer, the term of this patent is extended or adjusted under 35 U.S.C. 154(b) by 0 days.

(21) Appl. No.: 17/541,856

(22) Filed: Dec. 3, 2021

(65) Prior Publication Data

US 2022/0092616 A1 Mar. 24, 2022

Related U.S. Application Data

(63) Continuation of application No. 16/106,075, filed on Aug. 21, 2018, now Pat. No. 11,232,463.

(51) Int. Cl.
*G06Q 30/00* (2012.01)
*H04M 3/51* (2006.01)
(Continued)

(52) U.S. Cl.
CPC ..... *G06Q 30/0201* (2013.01); *G06Q 10/0635* (2013.01); *G06Q 10/0637* (2013.01);
(Continued)

(58) Field of Classification Search
CPC combination set(s) only.
See application file for complete search history.

(56) References Cited

U.S. PATENT DOCUMENTS 7,107,535 B2    9/2006  Cohen et al.
7,152,106 B2   12/2006  Cohen et al.
(Continued)

FOREIGN PATENT DOCUMENTS

CA         2995929          9/2018
WO    WO-2016191749 A1 *  12/2016  ......... G06F 3/04842

OTHER PUBLICATIONS

A. Terragni and M. Hassani, "Analyzing Customer Journey with Process Mining: From Discovery to Recommendations," 2018 IEEE 6th International Conference on Future Internet of Things and Cloud (FiCloud), 2018, pp. 224-229, doi: 10.1109/FiCloud.2018.00040. (Year: 2018).*

(Continued)

*Primary Examiner* — Crystol Stewart
(74) *Attorney, Agent, or Firm* — Pearl Cohen Zedek Latzer Baratz LLP

(57) ABSTRACT

A method and system for analyzing interactions (for example between a person and an organization) may include for a number of series of interactions (which may be termed journeys), each interaction represented by a channel and a reason, iterating over the series of interactions by selecting initial information including an interaction subset including one or more interactions, and if there is a set of interaction series among the series of interactions meeting certain conditions, adding an interaction to the interaction subset and determining in a recursive fashion if for the interaction subset, there is a subset among the set of interaction series meeting the conditions which also meet the conditions. Conditions may include a threshold average rating for the set of interaction series, and a threshold number of interaction series in which the interaction subset is found.

21 Claims, 6 Drawing Sheets

(51) Int. Cl.
*G06Q 10/06* (2012.01)
*H04M 3/523* (2006.01)
*G06Q 30/02* (2012.01)

(52) U.S. Cl.
CPC ........ *G06Q 30/016* (2013.01); *H04M 3/5166* (2013.01); *H04M 3/5183* (2013.01); *H04M 3/523* (2013.01); *H04M 2203/551* (2013.01)

(56) References Cited

U.S. PATENT DOCUMENTS

| | | | |
|---|---|---|---|
| 7,305,633 B2 | 12/2007 | Cohen et al. | |
| 7,644,134 B2 | 1/2010 | Cohen et al. | |
| 7,673,340 B1 | 3/2010 | Cohen et al. | |
| 7,725,840 B2 | 3/2010 | Cohen et al. | |
| 8,769,441 B2 | 7/2014 | Cohen et al. | |
| 8,942,369 B2 * | 1/2015 | Tuchman | H04M 3/523 379/265.09 |
| 9,092,801 B2 | 7/2015 | Chang et al. | |
| 9,596,350 B1 | 3/2017 | Dymshyts et al. | |
| 10,091,361 B1 | 10/2018 | Howard | |
| 10,616,415 B1 * | 4/2020 | Howard | H04M 3/5141 |
| 10,755,293 B2 | 8/2020 | Chang et al. | |
| 2004/0249650 A1 | 12/2004 | Freedman et al. | |
| 2005/0289560 A1 * | 12/2005 | Sedogbo | G06F 8/38 719/328 |
| 2015/0098561 A1 * | 4/2015 | Etison | G06Q 10/06398 379/265.06 |
| 2016/0048778 A1 | 2/2016 | Sharon et al. | |
| 2016/0119477 A1 | 4/2016 | Sharpe et al. | |
| 2016/0283888 A1 | 9/2016 | Laing et al. | |
| 2016/0352900 A1 | 12/2016 | Bell et al. | |
| 2017/0054852 A1 | 2/2017 | Mcgreevy et al. | |
| 2017/0094058 A1 | 3/2017 | Piaggio et al. | |
| 2017/0154495 A1 | 6/2017 | Sri et al. | |
| 2017/0186018 A1 | 6/2017 | Nandi et al. | |
| 2017/0308917 A1 | 10/2017 | Winters et al. | |
| 2019/0034963 A1 | 1/2019 | George et al. | |
| 2019/0058744 A1 | 2/2019 | O'Connor et al. | |

OTHER PUBLICATIONS

Terragni, Alessandro, and Marwan Hassani. "Analyzing customer journey with process mining: From discovery to recommendations." 2018 *IEEE 6th International Conference on Future Internet of Things and Cloud (FiCloud)*, 2018, pp. 224-229, doi 10.1109/FiCloud.2018.00040. (Year 2018).

* cited by examiner

SYSTEMS AND METHODS FOR FINDING AN INTERACTION SUBSET WITHIN A SET OF INTERACTIONS

PRIOR APPLICATION DATA

The present application is a continuation of prior U.S. patent application Ser. No. 16/106,075 filed Aug. 21, 2018, entitled "SYSTEMS AND METHODS FOR FINDING AN INTERACTION SUBSET WITHIN A SET OF INTERACTIONS", incorporated by reference in its entirety.

FIELD OF THE INVENTION

The invention relates generally to person-organization interaction technology (e.g. customer-website interaction, caller-agent interaction), and in particular, determining a subset of interactions common to a set of interactions meeting certain criteria.

BACKGROUND OF THE INVENTION

Technology exists to analyze interactions a person (such as a customer) has with agents (e.g., people or computerized processes). Interactions or sessions may include conversations or exchanges people have, for example a person accessing data via IVR (interactive voice response) interface, or a customer speaking with customer service agents or sales agents, for example agents at credit card companies, banks, or retailers. Computerized or computer-aided analysis may help supervisors or analysts identify and analyze patterns in interaction data, and patterns which result in good or bad results for people participating in the interactions. For example analysis of such patterns may be used to determine patterns within interactions result in good or bad customer experience.

In some analysis methods, a series of interactions between a person and an organization, which pertain to the same general issue, may be termed a journey or interaction series. A journey or interaction series may refer to both the actual process of the customer interacting with the organization, and also the data representing that process; similarly an interaction may refer to the actual event of a person interacting with an organization, and the data representing such an interaction. Each interaction may be or may describe one specific communication session between a person and an organization, e.g., one phone call. A person may communicate with an organization across a period such as hours, days or weeks, using multiple interactions, and this may be called journey. A journey may be defined or described in part by a series of interactions, typically an ordered series, each interaction being described by a pair or tuple (e.g. an ordered list), one item in each pair or tuple being the mode of communication (e.g. telephone call, "voice", mobile telephone call, IVR, text, e-mail, chat, paper mail, retail (in person at a store) etc.) and another item being the subject or the primary subject of the communication (e.g. billing, return, complaint, sale, technical support, etc.). For example, a customer may navigate through an internet site of an organization, hold a chat interaction with an agent through a chat interface in the internet site, call the company and navigate through an IVR system, and talk to an agent. Each of these interactions may happen several times in a single journey. A business perspective may be the journey the business plans; while the customer perspective may be what actually happens. Analysis may attempt to find a link between customer journey to what the business planned.

In current technology, a human analyst or a process may review a journey, understanding using their experience how the journey was designed, and extract an actionable insight. An analyst may for example use tools to search through journey data, and then extract insights.

SUMMARY OF THE INVENTION

A method and system for analyzing interactions (for example between a person and an organization) may include for a number of series of interactions (which may be termed journeys), each interaction represented by a channel and a reason, iterating over the series of interactions by selecting initial information including an interaction subset including one or more interactions, and if there is a set of interaction series among the series of interactions meeting certain conditions, adding an interaction to the interaction subset and determining in a recursive fashion if for the interaction subset, there is a subset among the set of interaction series meeting the conditions which also meet the conditions. Conditions may include a threshold average rating for the set of interaction series, and a minimum or threshold number of interaction series in which the interaction subset is found.

In one embodiment, a system and method may analyze a plurality of interaction series (e.g. journeys), each interaction series associated with a rating and including a series of interactions, each interaction including a tuple, for example an interaction channel and an interaction reason pair. An embodiment may select an interaction channel and interaction reason pair as an interaction subset, set a working set of interaction series equal to the plurality of interaction series, and set a rating threshold equal to an initial rating threshold. Iterating may then occur using operations including:

a) for the interaction subset, determining if there is a set of interaction series among the working set of interaction series meeting the conditions such that each interaction series in the set of interaction series includes the interaction subset, the average rating of the interaction series in the set of interaction series is equal to or above the rating threshold and the set of interaction series includes at least a threshold number of interaction series;

b) if no set of interaction series meets the conditions, then: selecting an interaction channel and interaction reason pair different from the last interaction channel and interaction reason pair in the interaction subset, and replacing the last interaction channel and interaction reason pair in the interaction subset with the different interaction channel and interaction reason pair; and repeating the iteration; and c) if a set of interaction series meets the conditions, then: selecting an interaction channel and interaction reason pair and adding it to the interaction subset as the last interaction channel and interaction reason pair in the interaction subset;

setting the working set of interaction series to be the set of interaction series;

setting the rating threshold to be the average rating of the set of interaction series; and repeating the iteration.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Figure 1A:
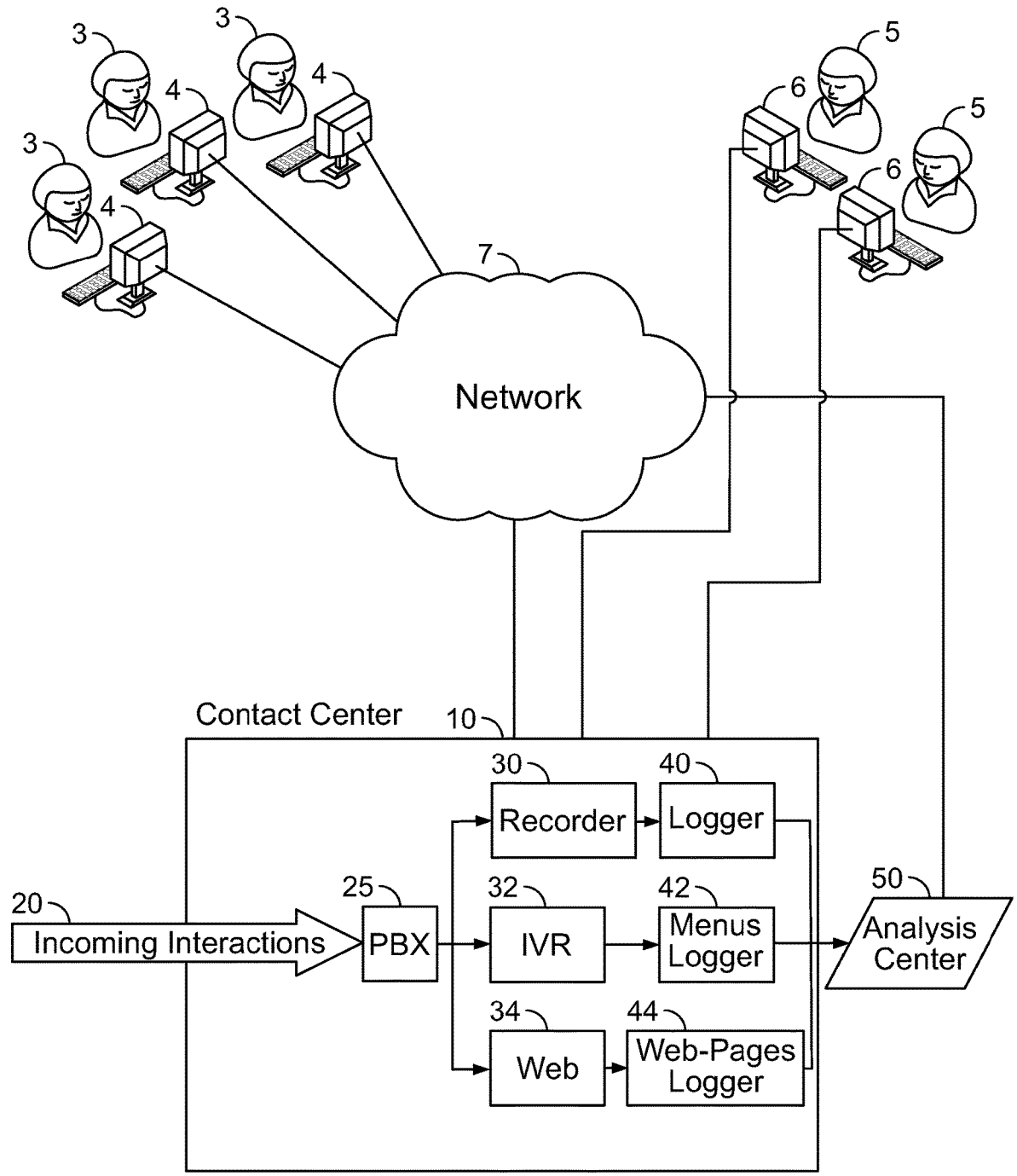
FIG. 1A is a block diagram of a system for recording and analyzing interaction data according to an embodiment of the present invention.

FIG. 1A is a block diagram of a system for recording and analyzing interaction data according to an embodiment of the present invention. While FIG. 1A shows a system creating and recording interactions or sessions at a contact center, interactions and journeys (e.g. interaction series) can be created in other ways. Incoming interactions 20 among people 3 (e.g., telephone calls, IVR interactions, etc.) and agents 5 may enter a contact center 10 and be routed for example by a PBX (private branch exchange) 25 or other equipment to relevant systems, such as interactive voice response (IVR) block or processor 32, Internet sessions or web block 34 and voice interactions block or recorder 30. People 3 may operate user equipment 4 to communicate with agents 5 via contact center 10; and agents 5 may operate agent terminals 6 for that communication and other purposes.

Contact center 10 may be for example maintained or operated by a company (e.g. a bank, a store, an online retailer), government or other organization. Interaction data may be stored, e.g., in files and/or databases: for example logger 40, menus logger 42, and web-page logger 44 may record information related to interactions, such as the content or substance of interactions (e.g. recordings and/or transcripts of telephone calls) and metadata (e.g. telephone numbers used, customer identification (ID), etc.). The data from contact center 10 may be output, sent or exported to an analysis center 50, typically periodically, e.g. once a day. Analysis center 50 may be part of contact center 10, or external to and/or remotely located from contact center 10. The transfer may be via for example SFTP (Secure File Transfer Protocol), but may be via other methods.

One or more networks 7 may connect equipment or entities not physically co-located, for example connecting user equipment 4 to contact center 10, and contact center 10 to analysis center 50. Networks 7 may include for example telephone networks, the Internet, or other networks. While in FIG. 1A contact center 10 is shown passing data to analysis center 50, these entities may communicate via a network such as networks 7.

Web block 34 may support web interactions over the Internet (e.g. operate web pages which may be executed in part on user equipment), IVR block 32 may provide menus and other information to customers and for obtaining selections and other information from customers, and recorder 34 may process or record voice sessions with customers. It may be appreciated that contact center 10 presented in FIG. 1A is not limiting and may include any blocks and infrastructure needed to handle voice, text (SMS (short message service), WhatsApp messages, chats, etc.) video and any type of interaction with costumers.

Figure 2:
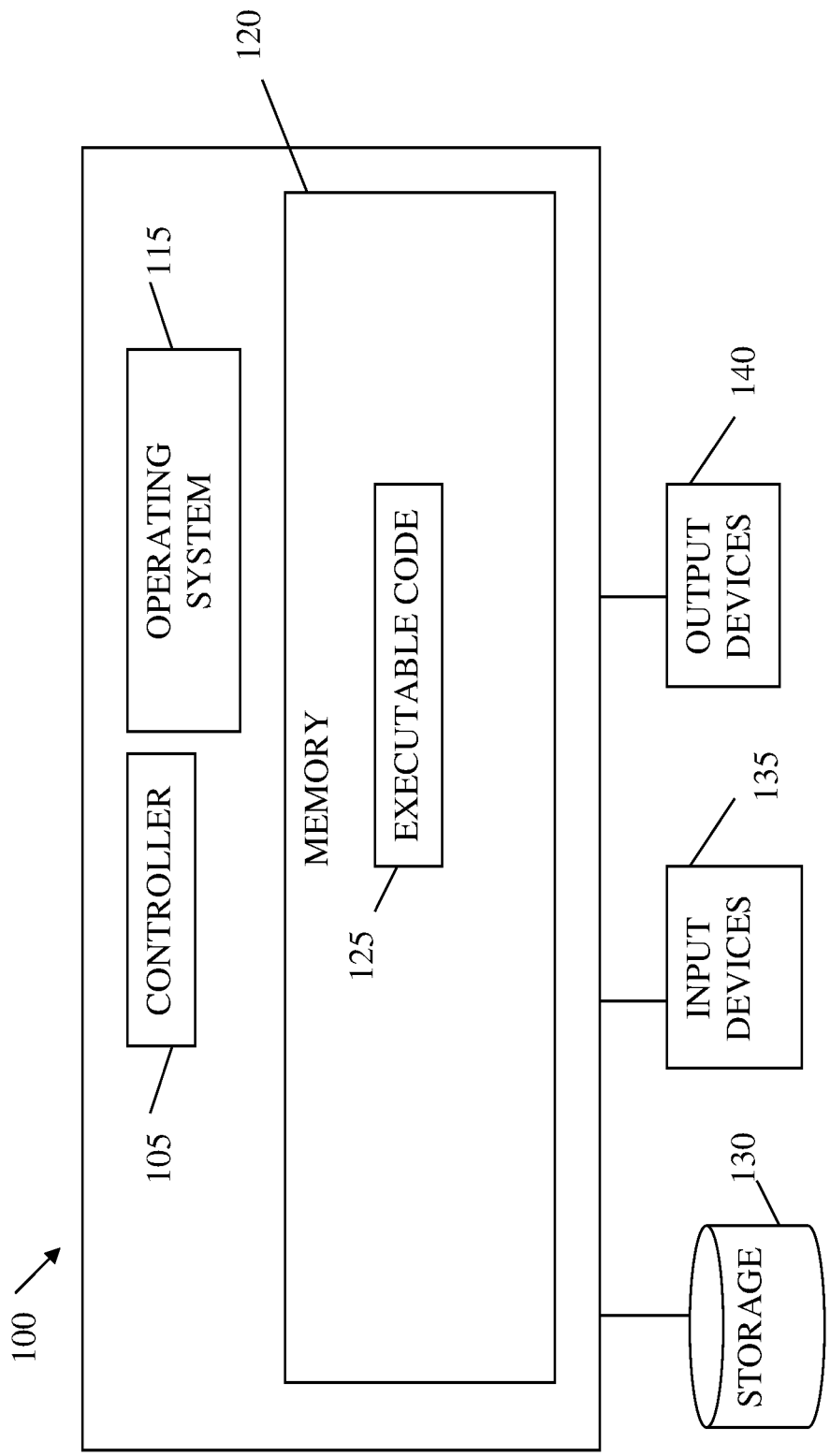
FIG. 2 shows a high level block diagram of an exemplary computing device which may be used with embodiments of the present invention.

User equipment 5 and agent terminals 6 may include computing or telecommunications devices such as personal computers or other desktop computers, conventional telephones, cellular telephones, portable or tablet computers, smart or dumb terminals, etc., and may include some or all of the components such as a processor shown in FIG. 2.

The data exported to analysis center 50 may be formatted, extracted and/or normalized to be data that represents features of journeys. Data may be stored in various formats, such as one tuple, representing an interaction session, per row, or other formats. In one embodiment, the data may include a number (typically thousands or millions) of journeys, each journey being a series or vector of individual interactions, typically ordered, where interactions may (e.g. may be represented as) be pairs or 2-tuples including a reason or a contact reason (or a primary reason) for the interaction and the mode or channel of communication or touch point for the interaction (e.g. telephone, IVR, chat, web (e.g. internet communication), mobile telephone call, paper mail, etc.). Journeys are typically ordered series, such that the order of the pairs or tuples making up the journey matter. Journeys and/or interactions may include or be associated with other data, such as metadata describing the customer identification, channel identification (e.g. telephone number), start and/or stop time, duration in time of the interaction or journey, or other data. While the creation or extraction of journey data from the various interactions may be performed by contact center 10, such data may be created or extracted by another entity such as analysis center 50. In other embodiments, interactions may be represented with other or more information. For example, an interaction may be a vector of features based on the actual interaction such as the start time, end time, customer ID, channel, contact reason, etc.

Figure 1B:
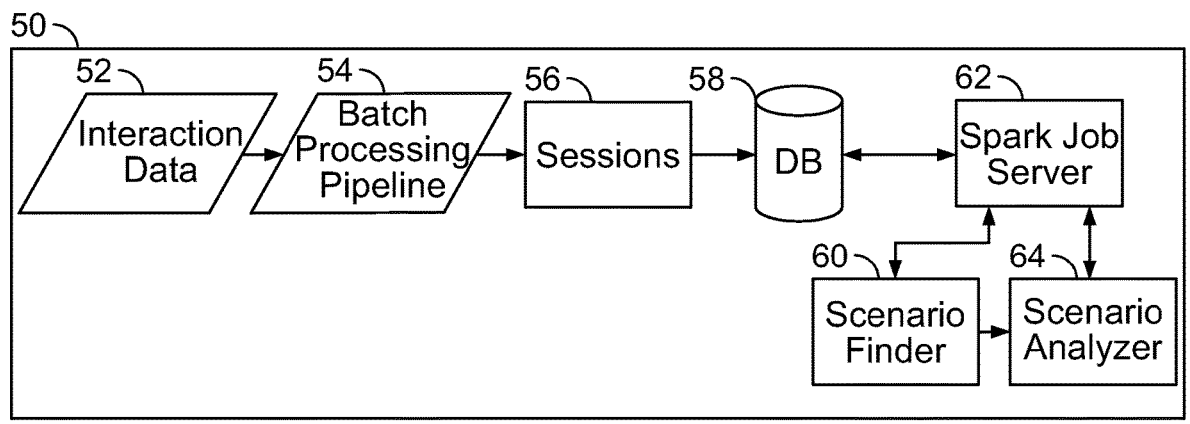
FIG. 1B is a block diagram of a system for analyzing interaction data according to an embodiment of the present invention.

FIG. 1B is a block diagram of a system for recording and analyzing interaction data according to an embodiment of the present invention. Analysis center 50 may receive data 52 from for example a call center (e.g. contact center 10) or another source, for example via SFTP, or another method. Data may enter a batch processing module 54, which may for example, format, if needed, incoming interaction data to standardize the data for analysis, for example creating tuples, collecting data into journeys, and rating or ranking the journeys, possibly via batch processing. The output of this may be session data 56. The data may be formatted for example to be one interaction session per row. The data may be stored in one or more database(s) 58 which may be for example an Apache Hive operated set of database(s). Database 58 may use the Hive system to allow rational database queries over a Hadoop distributed file system.

A scenario finder module 60 may find particular scenarios within the journeys according to particular criteria, possibly by interacting with a job server 62 such as a Spark Job Server, which may interact with database(s) 58. A scenario may be set or series of interactions, typically ordered, which is typically a subset of interactions which appear in a number of journeys. Scenario finder module 60 may perform its function in a different manner, for example not requiring job server 62. A scenario analyzer module 64 may accept scenarios produced by scenario finder module 60 and return journeys including those scenarios according to particular criteria, possibly by interacting with a job server 62, which may interact with database(s) 58 (scenario analyzer module 64 may perform its function in a different manner, for example not requiring job server 62). Scenario analyzer module 64 may also perform functions such as accepting user input and analyzing journey data, issuing alerts, etc. Technologies other than Spark, Hive, and SFTP may be used.

For example, scenario analyzer module 64 may take as input recommended scenario(s), and then access database 58 to extract journeys including those scenario(s). Scenario analyzer module 64 may allow a user to analyze journeys including scenarios found according to embodiments of the present invention: for example scenario finder module 60 may present to a user and/or scenario analyzer module 64 the top 10 "worst" scenarios, which then may be used to find journeys including those scenarios, the journeys being analyzed by scenario analyzer module 64.

A user may configure scenario finder module 60 to produce a set of scenarios, for example by defining a score range or score thresholds, and selecting a category of score or what the score is to represent (e.g., selecting a Key Performance Indicator (KPI) score range, and selecting that the KPI score represent journey duration, customer satisfaction, etc.), and/or other configuration parameters. In one embodiment, only a random selection of customer journeys may be selected or a random selection of customer events will be chosen to create customer journeys, as data 52 (e.g. customer event data) may be too large to process. Such culling need not be performed. Culling of customer data may be performed in other ways: for example journeys related to a specific business process may be selected.

FIG. 2 shows a high level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140. Each of modules and equipment such as contact center 10, IVR block or processor 32, Internet sessions or web block 34 voice interactions block or recorder 30, logger 40, menus logger 42, web-page logger 44, user equipment 4, agent terminals 6 and analysis center 50 may be or include a computing device, such as included in FIG. 2, although various units among these entities may be combined into more than one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units.

Executable code 125 may be any executable code, e.g., an application, a program, a process, task or script. Executable code 125 may be executed by controller 105 possibly under control of operating system 115. For example, executable code 125 may be an application which finds sequences in journeys, pre-processes journeys, controls recording of interactions, controls IVR responses, etc., according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Interaction and journey data Content may be stored in a storage 130 and may be loaded from storage 130 into a memory 120 where it may be processed by controller 105. In some embodiments, some of the components shown in FIG. 2 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In one embodiment, preprocessing, or creating formatted journey data from the disparate real-world data recorded by contact center 10, for example using batch processing module 54, may include extracting data in a process which may be called sequencing. Interactions received from customers may be marked or associated with metadata such as a customer ID, session or interaction ID, start time of an interaction or journey, and end time of an interaction or journey. Data for each "touch point" or channel for communicating may be stored in a different file or database, for example: an IVR session file; a chat session file, etc. A process may review all such files, identify sessions or interactions for a particular person or customer, and other data such as the start and end time for the session or interaction. The mode or channel may be identified and assigned to each interaction. In some embodiments a time or duration of an interaction (e.g. a single telephone call or chat session) is the end time minus the start time, while time of a journey may be for example over weeks of months, as it may be the end time of the last interaction in the journey minus the start time of the first interaction in the journey. Interactions may be separated in time for example by for hours, days or weeks.

Preprocessing may include a correlation of data with a business perspective, which may include assigning or determining for each interaction or session a contact reason or subject, which may be termed classification or categorization. Typically after sequencing reasons may be assigned or added to interactions to form pairs or tuples. For example a rule based system may review session data and use available data to determine and assign a contact reason, which may represent a business process. In one embodiments the reason may be a reason selected from a finite set of reasons that best maps to reasons most often appearing in data describing a session or interaction. Reasons may be assigned for example based on telephone call, text or other transcripts, agent summaries or notes (which may include for example a manually defined category of the call and some additional textual information). For other channels such as web communications, reasons may be assigned based on the title and the content of the web page; for IVR channels reasons may be assigned based on the text of the prompt.

A journey may be created in preprocessing from multiple different databases: for example a journey may be created from data in an IVR session file indicating that customer A communicated via IVR on a certain date (one interaction), and then that same customer communicated via chat at another time (a second interaction).

Both channels and reasons describing interactions or sessions may be chosen from a fixed set or of channels and reasons, in order to ease the automated processing of the data.

Each journey, typically including an ordered series of interactions, may include or be assigned (e.g. by contact center 10, or by another entity) one or more measures or ratings, such as KPIs, which rate, assess or rank the journey. Ratings or KPIs are typically numerical (e.g. 0-1, percentage, 1-100, etc.) but need not be, and may measure customer satisfaction across a journey, the quality of a journey or the duration of a journey. Other metrics for ratings can be used, such as customer effort score or other customer experience metrics, probability to churn, or probability to complaint. In one example, ratings or KPIs are equal to, or are a measure of, the total duration of the journey, e.g. the start time of the first interaction subtracted from the end time of the last interaction: in this manner extreme behavior in terms of total duration may be found, and scenarios, or sets or series of interactions, may be found which lead to lengthy journeys. Scenarios may be internally ordered such that the ordering of the sets of interactions within each scenario differentiates the scenario from others that have the same set of interactions. Journeys may also be differentiated by their internal ordering. In one embodiment, journeys including highest or lowest ratings or KPIs may be found to measure the most extreme ratings for journeys or series of interactions; however, other analyses may be performed. Journeys or series of interactions may be ordered based on ratings or KPI scores. Other ratings or KPIs such as customer satisfaction or probability to churn may be used.

For example, a set of sessions may include data such as a common ID across sessions (e.g. a "sequence ID") which may be the session, sequence ors journey ID (which may be assigned during sequencing), the start time and/or date and end time and/or date (e.g. standardized to a standard time such as Greenwich Mean Time (GMT), the channel or mode type, the reason, and the duration (e.g. in seconds). In one embodiment, more than one level of reason may be attributed to each interaction, for example, based on detail (with more details for lower levels), or a genus/species relationship. For example a "high reason" may be billing, where "mid reason" may be billing-overpayment. A user may select on which reason level analysis is performed. In one embodiment, journeys are not represented as data separate from interactions, and interactions having the same ID form a journey. Thus journeys are represented in data as the disparate interactions in a database having the same ID. Other formats for representing interactions and journeys may be used; for example a duration may be described using units or a format other than seconds. Table 1 shows example data representing sessions or interactions:

TABLE 1

| ID | Cust. ID | Start time | End time | Channel type | Reason | Duration (Seconds) |
|---|---|---|---|---|---|---|
| 4987020 | 42 | Oct. 2, 2017 8:09:13 | Oct. 2, 2017 8:10:31 | IVR | Billing & Payment | 78 |
| 4987020 | 42 | Oct. 2, 2017 8:10:35 | Oct. 2, 2017 8:12:23 | Mobile | Technical Support | 108 |
| 4987020 | 42 | Oct. 2, 2017 8:33:40 | Oct. 2, 2017 8:35:29 | Voice | Technical Support | 109 |
| 4987030 | 42 | Oct. 2, 2017 8:33:20 | Oct. 2, 2017 8:35:13 | Voice | Billing & Payment | 113 |
| 4987030 | 42 | Oct. 2, 2017 8:50:20 | Oct. 2, 2017 8:51:52 | Web | Billing | 92 |

The data from Table 1 shows example data representing two journeys; in typical practice data in database 58 will store data from thousands or possibly millions of journeys. From data similar to that in Table 1 or corresponding to the above, pairs or tuples, representing individual interactions, may be created, such as (IVR, Billing & Payment), (Mobile, Technical Support), (Voice, Technical Support), (Voice, Billing & Payment), (Web, Billing).

Scenarios, or sets of interactions that occur within journeys (the journeys contain the scenarios, or the scenarios are a subset of the tuples within the journeys), may be found each of which are common to a set of journeys such that the set of journeys satisfies certain conditions and includes the scenario. In one embodiment the conditions may be that a) a minimum number or percentage of journeys are found that include the scenario and b) the rating of the scenario, where the rating of a scenario equals or is inherited from the journey(s) in which it is contained, meets, or is equal to or above a threshold. The rating of a scenario relative to a set of journeys may be the average rating of the journeys in which the scenario appears.

In one embodiment a scenario, or an interaction subset that occurs within a journey (e.g. the interaction subset being a subset of the tuples in the journey), is contained within a journey if the sequence of interactions in the scenario appears within the journey sequentially, typically in the same order, but not necessarily consecutively. Thus for example if a journey is defined as:

(telephone, billing)→(telephone, billing)→(chat, billing)
→(web, technical support)→(telephone, technical support)→(web, billing)

a scenario, or series or set of interactions that occurs within the journey may be:

(telephone, billing)→(chat, billing)→(web, billing).

In such a case the scenario being within the journey does not require that the interactions in the scenario be contiguous (e.g. not be "direct"), or one immediately after another, in the journey. Scenarios that are deemed to occur in journeys such that in the journey includes interactions not appearing in the scenario in-between interactions that do appear in the scenario may be said to be "indirect". In some embodiments, finding journeys that include scenarios in an indirect sense inherently finds journeys including scenarios in a direct sense: indirect includes as a subset direct. In other embodiments contiguity (e.g. being direct) may be required. Typically a scenario is deemed to be within a journey only if the tuples in the scenario appear in the journey in the same order as in the scenario; in other embodiments ordering need not be required. The scenario of:

(telephone, billing)→(chat, billing)→(web, billing)

may be common to, or within, both of the following journeys:

(telephone, billing)→(telephone, billing)→(chat, billing)
→(web, technical support)→(telephone, technical support)→(web, billing); and
(chat, technical support)→(telephone, billing)→(chat, billing)→(telephone, technical support)→(web, billing)→(paper mail, general comment).

Prior to iterating to search for scenarios, journeys or series of interactions may be sorted or ordered based on ratings, or other factors. In one embodiment, journeys or interaction series may be ordered or sorted by a measure or rating, and an iterative or recursive process may start at the beginning of the list of journeys (which may have the lowest or highest rating; typically extreme journeys are analyzed), and each iteration cycle of a process may step through the list of journeys. After a number of iteration cycles the largest scenario (the scenario with the most interactions) common to a subset of journeys such that the average rating of the journeys meets, or is greater than a rating threshold and the subset of journeys is at least as large as a minimum threshold may be found. In a typical embodiment the iteration process is both recursive, to find larger scenarios, and branches, to find more than one scenario.

In such a matter frequent, direct or indirect sequences of interactions (e.g. scenarios) that typically occur in journeys showing extreme behavior with respect to a given KPI may be found. Each journey has a score with respect to a given KPI. For example, if a rating or KPI for analysis is 'total duration' (e.g. computed by subtracting a journey start timestamp from end timestamp), a process may find typical scenarios that lead to very long journeys. Ratings or KPIs other than duration may be used. Such a process may build upon ideas from the sequential pattern mining technology, but extending and improving on such technology in a non-trivial way.

Before iterating, initialization may occur. A current scenario or interaction subset may be set to one tuple or interaction; a subsequent iteration cycle may add one tuple to the scenario typically at the end to form a two-tuple scenario, then a three-tuple, and so on (in some embodiments iterations may end when or before the scenario reaches a limit; e.g. scenarios as large only as three-tuple scenarios may be iterated). The initial tuple or interaction for an initial current scenario may be for example the first tuple along a list of all possible tuples or interactions (e.g. all combinations of interaction channel/interaction reason in a particular implementation). The list of all possible tuples or interactions may be limited to tuples or interactions appearing in the data set of journeys.

Each iteration cycle may start at the beginning or top of the list of journeys (e.g. lowest or highest rating) to find journeys containing a scenario or interaction subset (e.g. the "current" scenario or interaction subset for an iteration cycle) for which the conditions of the number of journeys found, e.g. the size of the subset of journeys (e.g. an absolute number or percentage), which may be termed "support", meets, or is equal to or above a threshold; and the average score of the journeys in the set meets, or is equal to or above a second threshold. On each pass through the journeys, a scenario, interaction subset or sequence of interactions may be chosen, and the journeys may be traversed top to bottom to find journeys containing the sequence. The average score of the journeys found (that include the sequence) should in one embodiment not be below a threshold: thus, since in one embodiment the journeys are ordered by score and traversed in order from high score to low, if a running (e.g. calculated after each new journey including the scenario is found) average score of the journeys including the scenario falls below the score threshold, the calculating of averages stops (e.g. "failure"), a different sequence is chosen and the list of journeys is traversed again. However, in one embodiment, after the minimum, or threshold number of journeys is found, the average score of the journeys found is calculated or checked, and if it is below a threshold, a different sequence is chosen and the list of journeys is traversed again.

If the threshold number of journeys is not found, the scenario or interaction subset (e.g. the "current" scenario or interaction subset) is modified, or a new scenario is chosen, and the list of journeys found is traversed again. The current scenario may be modified for example by replacing the last tuple or interaction in the ordered series of the current scenario with a different tuple. Replacement of the last tuple in the current scenario may be for example according to some order along a list of all possible tuples or interactions (e.g. all combinations of interaction channel/interaction reason in a particular implementation).

In the case that both conditions are met (the set of journeys found includes the required number of journeys and the average score of the journeys meets a threshold, e.g. "success") the scenario found in each journey in the set of journeys is expanded, typically by adding one transaction pair or tuple (e.g. including a channel and reason) to the series of transactions forming the scenario or interaction subset: a longer, more specific scenario is found, and an iteration cycle occurs again with this scenario as the current scenario. Expansion of the current scenario may be for example by choosing a tuple in a manner similar to replacement of the last tuple in the current scenario, but adding the tuple rather than replacing the last tuple: the tuple may be selected according to some order along a list of all possible tuples or interactions. Other methods of replacement of the last tuple, or expansion of the current scenario, may be used.

A "working set" of journeys, originally the entire list of journeys, is at the end of each "successful" iteration cycle (where the conditions are met) replaced by or set to the set of journeys that is found in that iteration cycle, and is typically ordered in the same way as the previous working set from which it is derived. In such a manner, on each successful iteration cycle the working set of journeys is reduced, and the current scenario increases in size.

Further, on the completion of a successful iteration cycle the score threshold may be altered: for example increased to be the average score of the subset of journeys found in the previous iteration. The working set of interaction series may be set to be the journeys found, shrinking the set of journeys to be searched over. In addition, each of the journeys found may be reduced by having a prefix removed, including only a suffix: in such a manner the place where the scenario is found may be "marked" by removing tuples up to and including this point. Thus if the conditions are met, the working set of interaction series may be set to be the set of interaction series by setting the working set of interaction series to be the "successful" set of interaction series where each interaction series has a prefix up to the tuple (e.g interaction channel and interaction reason pair) recently added to the interaction subset (as the last tuple) removed. Other ways of marking where the scenario is found may be used.

Pruning may take place as part of the process by eliminating a scenario from the algorithm and stopping an iteration cycle if the average score of journeys found to have the scenario drops below a minimum or threshold ("failure"): since the journeys may be ordered finding additional journeys that include the scenario will only lower the score further. E.g., if the top N journeys have the average score that is below a given value the search for journeys including the current scenario may stop.

In order to create a different sequence in the event that both thresholds are not reached, the scenario or current interaction subset may be modified, by replacing the last pair or tuple in the scenario or current interaction subset with a different one. For example, an interaction channel and interaction reason pair may be selected which is different from the last interaction channel and interaction reason pair in the scenario or interaction subset, and this pair may replace the last interaction channel and interaction reason pair.

Preprocessing can occur before the general process starts, and/or also before each iteration. For example, before the overall process begins, the list of journeys or interaction series may be processed to determine the list of tuples or interactions that actually appear in the data, and only those interactions or tuples may be used to form scenarios or interaction subsets. Other preprocessing may occur, for example selecting a random subset of journeys over which to iterate, to reduce the amount of data processed.

In some embodiments all possible scenarios (or all possible scenarios having interactions appearing in the set of journeys to be investigated) may be used for iteration. Thus each tuple or interaction appearing in the set of journeys may be used as an initial tuple in a current scenario or interaction subset, and in effect a number of parallel or sequential iterations may occur, one iteration for each initial interaction or tuple to begin a current scenario, and another for every combination of the initial tuple and all possible subsequent tuples, and so on. Thus in some embodiments for the first level iteration all one-unit scenarios that satisfy the iteration requirements (e.g. rating>threshold; minimum number of journeys) may be used, and scenarios may be built on those and used for iteration. Further, it may be the case that for each one-unit current scenario, or each multiple-unit current scenario, meeting both or all iteration requirements, multiple additional interactions that are added to create a two (or more)-unit scenario may meet the iteration requirements: all of these successful scenarios may also be iterated on in parallel or in series, resulting in "branching". When the algorithm finds a "successful" scenario it may expand the scenario and start an iteration (branching) process for this scenario.

The results returned may include multiple scenarios which meet the requirements, possibly ordered by rating or KPI. The rating or KPI assigned to a scenario or each scenario which results from the iterations may be the average rating or KPI of the journeys iterated over which include the scenario. Each scenario may inherit a rating from the journey(s) which contain the scenario (such that the scenario rating is equal to for example an average of the ratings of the journeys found which contain the scenario), but in one embodiment, since only a certain number of journeys, or a certain subset of journeys (e.g. a random subset), are iterated over to find journeys with the scenario, the scenario may inherit the average rating from the journeys which are iterated over.

After, or in-between each iteration cycle, e.g. after the algorithm found a successful scenario and before the expansion of a scenario, preprocessing may remove, from the beginning of each journey or interaction series, interactions or tuples up to and including the first interaction or tuple that is the last in the current scenario or interaction subset: the beginning of each interaction series may be removed until (or including) the first occurrence of the end of the current scenario or interaction subset. For example, if a journey has interactions A-B-C-D (replacing tuples with letters for simplicity), and the current scenario is B, or ends with B, before an iteration cycle A, or A and B, may be removed from this journey.

In some embodiments, during iteration order of both the current scenario and the journeys being reviewed is kept: i.e. a current scenario of interactions or tuples A-B (using letters rather than pairs) is considered to be different than scenario B-A, and the same applies to the ordering of tuples or interactions in journeys.

Iteration may stop at a length limit for the scenario: for example, no scenario having a length of more than three tuples or interactions may be used for iterating. Iteration may require a minimum length for the scenarios, e.g. two interactions.

Figure 3:
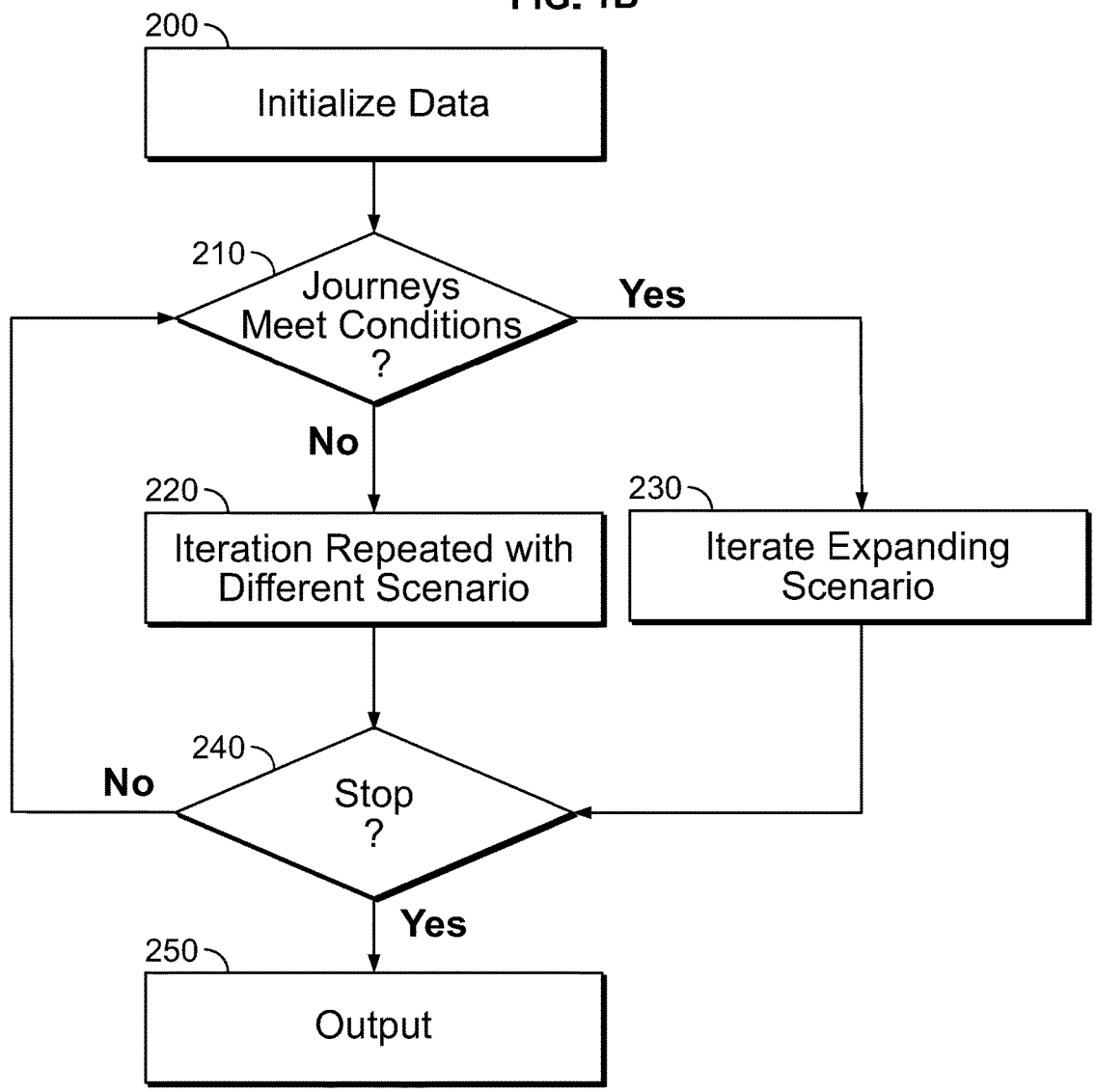
FIG. 3 is a flowchart of a method according to embodiments of the present invention.

FIG. 3 is a flowchart of a method according to embodiments of the present invention.

In operation 200, a set of journeys or interaction series may be received and iteration or recursion data may be initialized. For example, a working set of journeys or interaction series may be set equal to the set of journeys or a subset of journeys; a sequence or interaction subset (e.g. a current scenario) may be set equal to a tuple, or an interaction channel and interaction reason pair; and an initial rating threshold may be set equal to a rating or KPI threshold. Parameters for selecting a subset of journeys to analyze may include for example journeys related to a specific a business process e.g. Technical Support or Billing, a rating or KPI score range, etc. The numbers of journeys to select may be reduced (so that only a sample is analyzed) for example by performing a random selection of customer events or customer journeys. Some or all parameters be chosen e.g. by a system designer or system operator, e.g. a user designing a query. A user may set parameters to select which journeys to iterate over or analyze. The initial or working set of journeys may be sorted or ordered, for example by rating in descending order: if this is done, a process may traverse the set of journeys with the individual rating of each journey falling and the moving average falling, and when the moving average falls below a threshold, it can be assumed that no further journeys will raise that threshold, as the journey ratings fall as the list is traversed. Further, starting an analysis of journeys having the highest or lowest ratings, in an ordered list, allows finding scenarios that result in the most extreme ratings for journeys.

In operation 210, it may be determined for the interaction subset (e.g. a candidate scenario) if there is a set of journeys or interaction series among the working set of interaction series which meet a set of conditions or requirements. The conditions may be for example that each interaction series in the set includes the interaction subset; the average rating of the interaction series in the set of interaction series is equal to or above the rating threshold; and the set of interaction series includes at least a minimum, or threshold number of interaction series, or in some embodiments a threshold percentage of interaction series from the original or input set of interaction series. Other or different conditions may be used. An interaction series may be considered to include an interaction subset if the tuples or interactions in the interaction subset appear in order in the interaction series, consecutively or not (e.g. indirect). In another embodiment the tuples or interactions must appear consecutively (e.g. be direct).

In operation 220, if no set of journeys or interaction series meets the conditions (e.g. "failure"), then the iteration may be repeated with a different scenario or interaction subset may be used for iterating. An interaction channel and interaction reason pair different from the last (e.g. final) interaction channel and interaction reason pair in the interaction subset may be selected and may replace the last (e.g. final) interaction channel, and process may proceed to operation 240. In the case that interaction subset includes only one tuple, that tuple (being the last tuple) is replaced with the different interaction channel and interaction reason pair.

In operation 230, if a set of journeys or interaction series does meet the conditions (e.g. "success"), then the process may iterate again expanding the scenario or interaction subset and typically shrinking the working set of journeys or interaction series. In one embodiment, a tuple, or an interaction channel and interaction reason pair, may be selected (e.g., by traversing a list of possible tuples in order, or selecting from a set of pairs or tuples) and added to the interaction subset or "current scenario" as the last or final interaction channel and interaction reason pair in the interaction subset. The working set of journeys or interaction series may be set to be the set of interaction series which met the conditions. Each journey which is to be iterated on the next cycle may have its beginning or prefix removed, e.g. up to and including the last tuple added to the current scenario so that what it analyzed in the next cycle only the suffix (e.g. the last tuple added may be found in the suffix on the next cycle, as it already has been determined that the current scenario up to the last tuple is in each journey in the set): this may be one way of marking the current place in each journey of the journeys being searched. Other ways of marking a position may be used. The rating or KPI threshold may be set to be the average rating of the journeys or interaction series in the set of interaction series which met the conditions. The process may proceed to operation 240; in addition "branching" may occur as discussed elsewhere.

In operation 240, it may be determined if the process should stop and possibly produce an output, as typically scenarios of only a certain length are found; in other embodiments stopping based on scenario length may be omitted, and the process may find all scenarios in the set of interaction series corresponding to (e.g. being within all journeys within) sets of journeys meeting the conditions. If the current scenario is larger than a certain length or threshold (a certain number of tuples or interactions), the iteration may stop and the data may be returned, for example the scenario that has met the criteria. In addition, if there are no more tuples to add the iteration may stop: if there are no more pairs to select from the set of interaction channel and interaction reason pairs the iteration may stop. If the current scenario is not larger than a certain length or threshold, and there are more tuples to use, the iteration may repeat by proceeding to operation 210. Other factors may determine if the iteration process should stop, If the current scenario is larger than a certain length or threshold and/or there are no more tuples, the iteration may stop and in operation 250, possibly produce an output. In the case of multiple scenarios being collected as output, in the case of branching, the scenarios resulting, or the output, may be sorted for example based on the number of occurrences in the beginning set of journeys (e.g. support) or based on the average score for journeys found including the scenario.

In some embodiments, each possible combination of tuples (typically up to a size limit) may be tested as a current scenario. Such an embodiment may "branch" and, for each successful scenario found in operation 210, multiple scenarios of increased size may be determined and iterated on using operations 210-240, using the successful scenario as a base and adding tuples to the end of the base. For example, if in operation 230 the scenario having tuples A-B are found to be successful as a scenario, operations 210-240 may be repeated for each scenario A-B-X, where X is all possible or permitted tuples. Thus, if a set of interaction series meets the conditions in operation 230, then in addition to proceeding to operation 240, a tuple (e.g. an interaction channel and interaction reason pair) other than the one selected in operation 230 may be added it to the interaction subset as the last tuple, and iteration may proceed (e.g. with operation 210) as a parallel branch using the interaction subset.

In some embodiments, only scenarios including at least two tuples result in having journeys returned, although the scenarios when being built by a process typically start with a length of one.

After the process is topped, the interaction subset may be returned; if branching occurs multiple interaction subsets may be found.

Other or different operations may be used.

Figure 4:
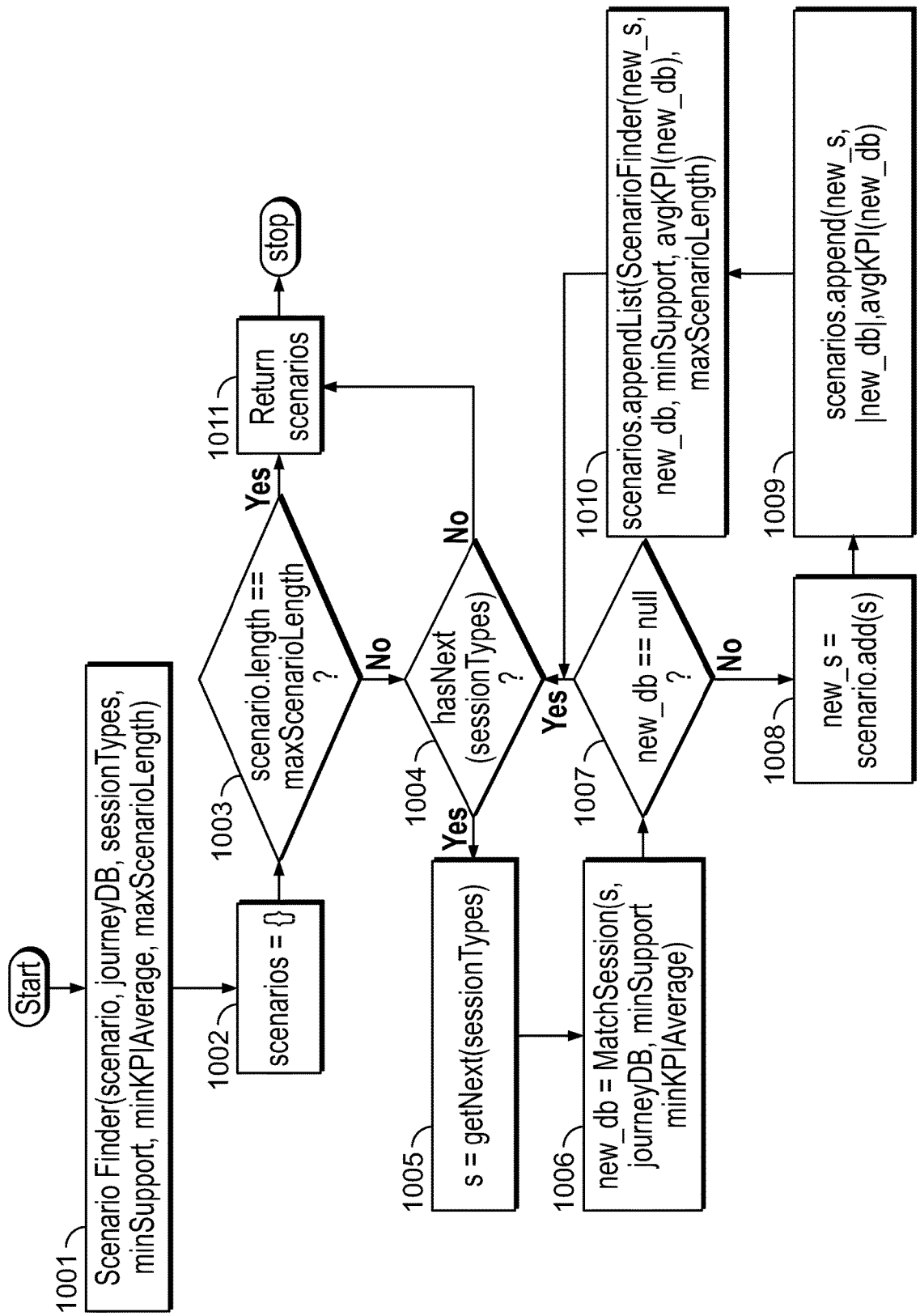
FIG. 4 is a flowchart depicting a sample set of operations to find scenarios in a set of journeys.
Figure 5:
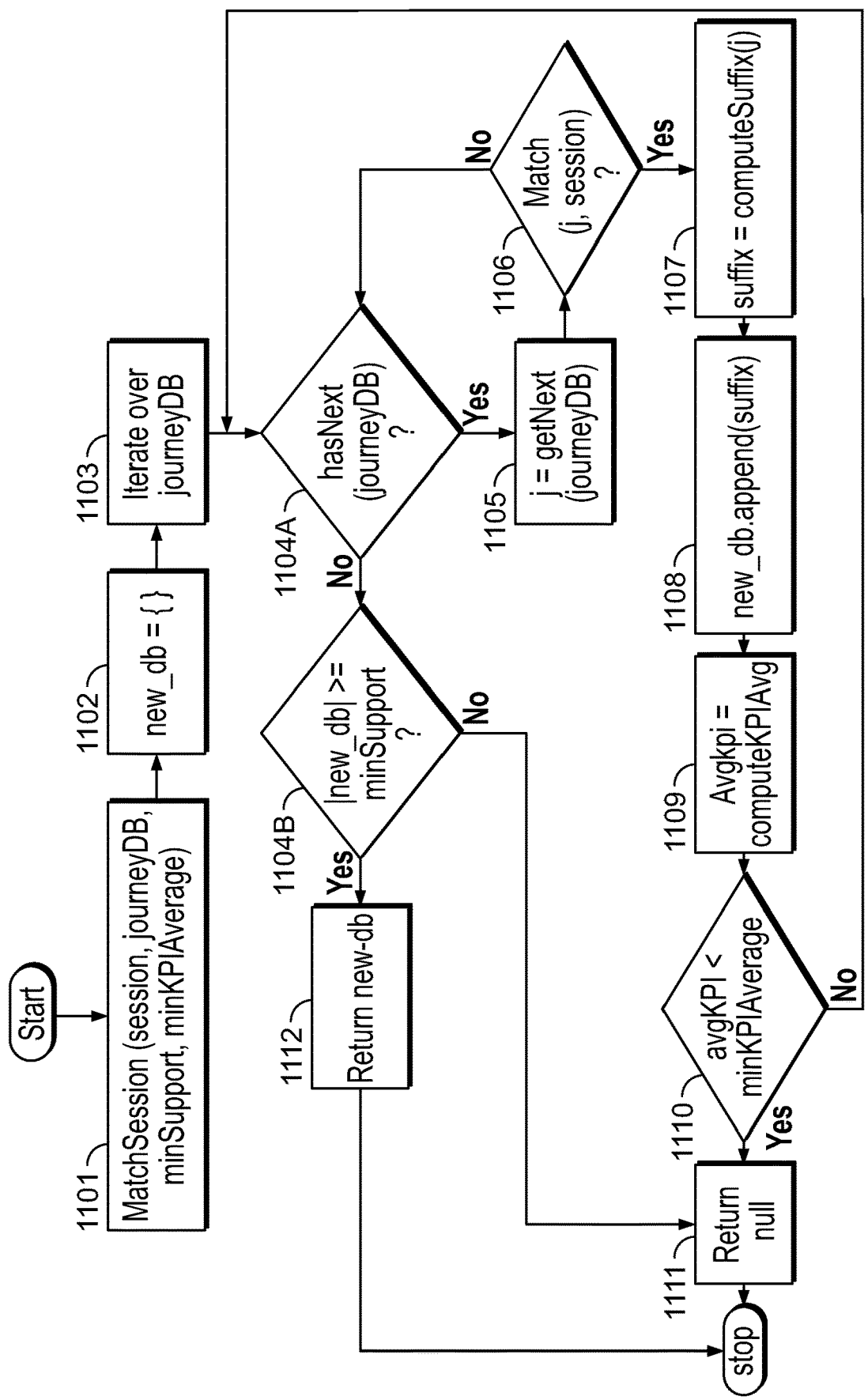
FIG. 5 is a flowchart depicting a sample set of operations to find scenarios in a set of journeys.

FIGS. 4 and 5 together describe an example process to find scenarios in a set of journeys, using Java-style notation. FIG. 4 describes a process of growing scenarios to search for from a list of tuples or session types, and inputting the scenarios into a process (operation 1006 below, an example of which is described in FIG. 5) to find the generated scenarios in journeys. FIG. 4 is a flowchart depicting a sample set of operations to find scenarios in a set of journeys. In operation 1001 a ScenarioFinder algorithm may be called with certain parameters, the journeyDB parameter including a customer journeys database, e.g. a sorted list of customer journeys for a given period of time; the scenario parameter initially being empty; the sessionTypes parameter may include all types of tuples (e.g. (channel, contact-reason) to use in a search; minSupport may indicate the minimum number of journeys that must be found to provide a result; minKPIAverage may indicate the minimum average score of journeys found in an iteration; and maxScenarioLength may indicate the scenario length in tuples at which a process stops. In operation 1002 a set of scenarios may be initialized as null; this set may collect "successful" scenarios as members of the set. In operation 1003 if the scenario length equals a maximum scenario length the process may terminate and in operation 1011 return scenarios. In operation 1003 if the scenario length is not equal to a maximum scenario length then in operation 1004 if there are more types of sessions, e.g. tuples, then in operation 1005 the next tuple or session type may be obtained from a list of sessionTypes, which may be tuples. In operation 1004 if there are no more types of sessions, e.g. tuples, then in operation 1011 the process may terminate and return one or more scenarios.

In operation 1006, the next tuple ("s" in operation 1006) may be used to find more journeys using for example a "MatchSession" process (e.g. described in FIG. 5) which may return, if any, a set of journeys (in one embodiment actually sub-journeys, having had prefixes removed) that match tuple s and comply with conditions (in this example minSupport and maxKPIAverage), where journeyDB is a database of journeys and new_DB is a database of journeys having prefixes removed. In one embodiment, a scenario, a series of tuples, is searched for in a database of journeys by searching, sequentially, for each individual tuple along the series of tuples. If an individual tuple is found in a database of journey suffixes (described below), that tuple is added to the scenario and the enlarged scenario is deemed to have been found in the database of journey suffixes.

In operation 1007, if no journeys are found in operation 1006, then the process moves to operation 1004 to determine if there are more types of sessions (e.g. tuples). In operation 1007, if journeys are found in operation 1006, the process moves to operation 1008 to add a session or tuple to the sequence or scenario being examined: for example the new sessionType that passed the MatchSession criteria in operation 1006 is appended to new_s.

In operation 1009 the scenarios set may have a successful scenario added. For example, the "scenarios" variable may be appended. One found scenario may be added, including other information such as the number of journeys that contain this scenario (e.g. support, where |new_db| indicates the cardinality of the set new_db) and the average rating or KPI for the scenario. Since in one embodiment the process is iterative, the algorithm may reach 1009 for every "successful" scenario found.

In operation 1010 recursion takes place and the result is appended to the list of scenarios. The process of operation 1001 starts again with new parameters, where new_s is a scenario, interaction subset or sequence of interactions of increased size (increased by one tuple in operation 1008), new_db is the set of journeys found in the last iteration (operation 1006), support is the support input in operation 1001, the rating threshold (e.g. avgKPI of the journeys found in operation 1006) is updated to be the average KPI or rating of the set of new journeys, and the scenario length limit is as input in operation 1001. The process then proceeds to operation 1004.

Other or different operations may be used.

FIG. 5 is a flowchart depicting a sample set of operations to find scenarios in a set of journeys, for example, a "MatchSession" process. The operations of FIG. 5 may correspond to operation 1006 described above. The example process in FIG. 5 finds scenarios one tuple at a time, by being called repeatedly, for each tuple.

In operation 1101 journeys are found fitting parameters. Input to MatchSession includes in one embodiment a session type (e.g. a tuple); journeyDB, which is a customer journey database, a sorted list of customer journeys for a given period of time; minSupport, the minimal required number of matching journeys, e.g. 1,000; and MinKPIAverage, the minimal required average rating or KPI of matching journeys. In operation 1102, a data structure to store journeys, e.g. New_db (newJourneyDB), may be initiated. Later, this may accommodate sub-journeys that contain a given tuple.

In operation 1103, an iteration cycle may start over all journeys in the journey database, e.g. journeyDB input to the MatchSession process in operation 1101.

In operation 1104A, if no journeys are left in the journey database (e.g. journeyDB), the operation moves to operation 1104B and new_db is returned as a result (operation 1112) only if its size is at least minSupport. In operation 1104A, if journeys are left in the journey database the sequence proceeds to operation 1105.

In operation 1104B, if the number of journeys is not at least minSupport, null—no journeys—is returned in operation 1111.

In operation 1105, the next journey is obtained from the set of journeys input to the process. In operation 1106, if the session (e.g. tuple, or interaction channel and interaction reason pair)) input in operation 1101 is in the next journey obtained in operation 1105, the sequence proceeds to operation 1107; otherwise the sequence proceeds to operation 1104.

In operation 1107, a suffix may be extracted from journey. For example, the first location of session (which may be termed the prefix) in the journey is found, and what is returned is only the part (which may be termed the suffix) following that session. In such a manner, the journey has its prefix up to and including the occurrence of the session (the individual tuple) removed.

In operation 1108, the shortened journey—the suffix—from operation 1107 may be added to the journey database new_db.

In operation 1109, the average rating may be calculated. For example, the average rating of a KPI may be computed by summing all KPI (or other rating) values from new_db and dividing by the size of new_db, e.g.:

$$\frac{1}{|new\_db|} \sum_{i=1}^{|new\_db|} KPI_i$$

In operation 1110, if the average rating is less than a minimum (e.g. minKPIAverage) the process may proceed to operation 1114; otherwise the process may proceed to operation 1111.

In operation 1112 new_db is returned as a result.

Other or different operations may be used.

Output of a process according to embodiments of the present invention may be for example, to a user, or to a scenario analyzer module or another module, allowing a user to analyze journeys including scenarios found. Output of a finder module or process may be configured by a user, and display of or actions taken as a result of results (e.g. via a scenario analyzer module) may be configured by a user. Output of a finder module may be ordered or limited: for example the output of a processes of FIGS. 3-5 may be a list of scenarios ordered by score, KPI, or support (the number of journeys found which include the scenario, thus providing scenarios that affect the most journeys) and may be limited to the top 10 or top X scenarios according to the ordering. The user may select a specific scenario and apply it for analysis using a scenario analyzer module.

Figure 6:
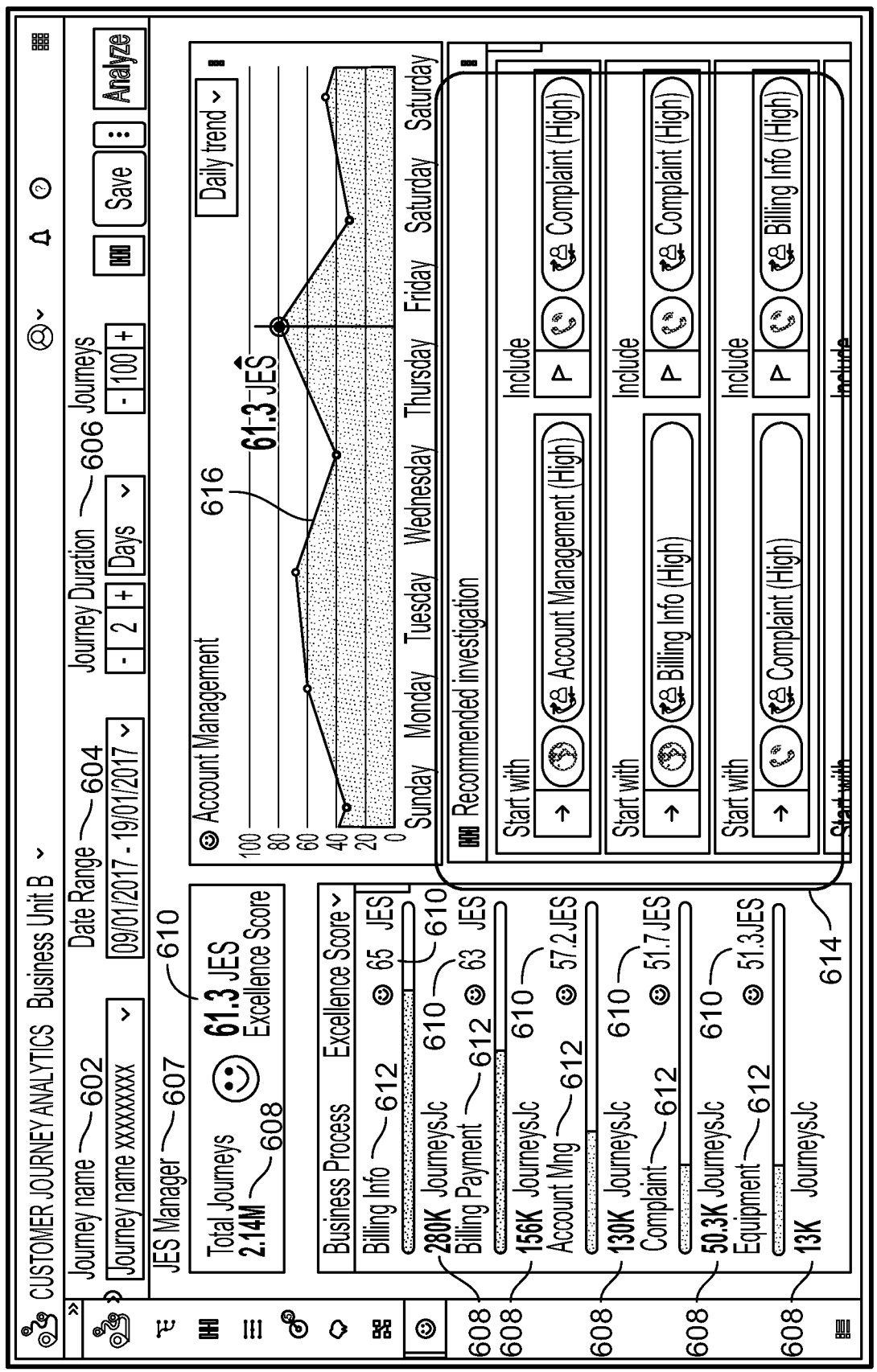
FIG. 6 is an example user interface for an analysis module according to embodiments of the present invention.

FIG. 6 is an example interface for an analysis module (e.g. scenario analyzer module 64) according to embodiments of the present invention. An analysis module may for example provide scenario recommendations to investigate for a set of journeys within a specific time period. An analysis module may for example provide scenario recommendations for a specific business process (for example a "Purchase process"). A user interacting with an analysis module via a user interface may for example select (e.g. via dragging and dropping) recommended scenarios, tuples, or other data items, to perform additional analysis. Functionality associated with the user interface or scenario analyzer module 64 may for example allow for monitoring a selected scenario over time and receiving alerts of volume, CX (customer experience), or cost changes. Alerts may be generated for example based on daily monitoring of data such as the number of journeys (e.g. volume) that include the scenario and, such that a system may trigger an alert if this number (volume) falls below, or rises above a given threshold. Functionality may also include sending to a user automatic improvement suggestions when customers change their behavior.

Referring to FIG. 6, a user may title a query 602 made to for example a scenario finder module, may supply a date range 604 for journeys to analyze, may limit or define the duration 606 of journeys over which to search, and may define other parameters for a query. Such a query may be input into a scenario search algorithm such as the embodiments described in FIGS. 3-5 to produce a set of scenarios, and those scenarios may then be sent to a database (e.g. using scenario analyzer module 64) as part of a query to return journeys that include the scenarios (in some embodiments to conserve processing power a scenario search algorithm does not iterate over all journeys saved in a database). A description of search results 607 may show for example the number of journeys 608 satisfying search criteria (2,140,000 in the embodiment shown) and the rating or score 610 (61.3 in the embodiment shown). A sub-list of the search results 612 may show the number of journeys within search results that are relevant to certain business process: for example in the embodiment shown among the 2,140,000 journeys, 280,000 journeys are relevant to "billing information" and have a rating of 65. A journey being relevant to a business process may mean that, while a journey may include multiple information exchanges each relevant to a different business process, the journey is primarily or mostly concerned with a certain business process. In one embodiment if a user clicks on or selects a business process among the business processes in 612 listed on the left in area 612, a recommended investigation 614 may be output, showing for example scenarios or data items to recommended for a user to investigate, for example scenarios starting with and including with certain tuples. The contact method element of a tuple may be represented by an icon (e.g. globe for internet, and telephone for telephone). In the specific example shown in box 614 the first set of scenarios recommended to be investigated start with contacting account management via the internet and also includes complaints made via telephone. Volume data 616 may show the number of journeys over time that include a specific scenario. Automatic alerts may be sent to an analyst based on the data produced by a scenario finder or based on data analyzed in an analysis process as shown in FIG. 6.

Embodiments of the invention may improve prior customer journey data analysis technology, and "big data" analysis, by allowing searching through journey data to find scenarios which are associated with extreme or severe ratings, e.g., scenarios which are contained within lengthy journeys, or journeys exhibiting high or low customer satisfaction. Some embodiments provide a unique and efficient algorithm which is more efficient than prior searching technology, saving computer processor time, memory, and/or user time. Current technology may provide simple search tools to analysts, or pattern capabilities such as "top journeys" that may count the number of journeys having the same types, "scenario results" that counts interactions for a specific scenario, or a "journey map" that shows intersections between different journeys. No current technology allows finding scenarios within sets of journeys, as is possible with embodiments of the present invention.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for analyzing a plurality of interaction series, each interaction series associated with a rating and comprising a series of interactions between a user device and a contact center, each interaction comprising a pair, the pair comprising an interaction channel and an interaction reason, the method comprising:
    a) selecting, by a processor, an interaction channel and interaction reason pair as an interaction subset within the series of interactions; wherein an interaction channel comprises a channel of communication representing one of a telephone call, SMS, IVR, chat, web interaction, mail, video and voice, and an interaction reason represents a reason for the interaction between a given user device and the contact center; and wherein an interaction series is created in preprocessing from multiple different databases, each storing interactions from a different interaction channel;
    b) setting, by the processor, a working set of interaction series equal to the plurality of interaction series, and setting a rating threshold equal to an initial rating threshold;
    c) for the interaction subset, determining, by the processor, interacting with a job server, if there is a set of interaction series among the working set of interaction series meeting a set of predefined conditions such that each interaction series in the set of interaction series comprises the interaction subset, an average rating of the interaction series in the set of interaction series is equal to or above the rating threshold, and the set of interaction series includes at least a threshold number of interaction series;
    d) if no set of interaction series meets the conditions, then:
        selecting, by the processor, an interaction channel and interaction reason pair different from the last interaction channel and interaction reason pair in the interaction subset, and replacing the last interaction channel and interaction reason pair in the interaction subset with the different interaction channel and interaction reason pair; and
        repeating, by the processor, operation c) using at least the different interaction channel and interaction reason pair; and
    e) if a set of interaction series meets the conditions, then:
        (i) selecting, by the processor, an additional interaction channel and interaction reason pair and adding the additional interaction channel and interaction reason pair to the interaction subset as the last interaction channel and interaction reason pair in the interaction subset;
        (ii) setting, by the processor, the working set of interaction series to be the set of interaction series;
        (iii) calculating, by the processor, a revised threshold for the rating threshold;
        (iv) repeating, by the processor, operations (i)-(iii) for at least a second additional interaction channel and interaction reason pair, until a predefined threshold is reached; and
        (v) after the predefined threshold is reached, returning, by the processor, the interaction subset;
    f) generating an alert based on a daily monitoring of the interaction series triggering a threshold; and
    g) automatically sending, by the processor, the alert to an analyst when a set of interaction series indicates a predefined behavior with respect to a given Key Performance Indicator (KPI).

2. The method of claim 1, wherein calculating a revised threshold for the rating threshold comprises: setting, by the processor, the rating threshold to be the average rating of the set of interaction series.

3. The method of claim 1, wherein the predefined threshold of operation e) is an iteration cycle limit; and
    wherein repeating, by the processor, operations (i)-(iii) for at least the second additional interaction channel and interaction reason pair comprises:
    iterating, by the processor, repeatedly until reaching the predefined iteration cycle limit; and
    after iterating reaches the predefined iteration cycle limit, returning, by the processor, the interaction subset.

4. The method of claim 3, wherein selecting an interaction channel and interaction reason pair comprises selecting an interaction channel and interaction reason pair from a set, the method comprising reaching the predefined iteration cycle limit when: there are no more pairs to select from the set of interaction channel and interaction reason pairs; or the interaction subset includes more than a threshold number of pairs.

5. The method of claim 4, comprising, if a set of interaction series meets the conditions, then:
    selecting an interaction channel and interaction reason pair other than the interaction channel and reason pair selected in operation e) and adding it to the interaction subset as the last interaction channel and interaction reason pair in the interaction subset; and
    performing operation b) using the interaction subset.

6. The method of claim 1, wherein selecting an interaction channel and interaction reason pair comprises selecting an interaction channel and interaction reason pair from a list of interaction channel and interaction reason pairs.

7. The method of claim 1, wherein the plurality of interaction series is ordered by rating, and wherein determining if there is a set of interaction series among the working set of interaction series meeting the conditions comprises starting with the interaction series having the highest rating.

8. The method of claim 1, wherein if a set of interaction series meets the conditions, setting the working set of interaction series to be the set of interaction series comprises setting the working set of interaction series to be the set of interaction series where each interaction series has a prefix up to the interaction channel and interaction reason pair added to the interaction subset as the last interaction channel and interaction reason pair removed.

9. The method of claim 1, comprising providing to a user the interaction series including the interaction subset.

10. A system for analyzing a plurality of interaction series, each interaction series associated with a rating and comprising a series of interactions between a user device and a contact center, each interaction comprising a pair, the pair comprising an interaction channel and an interaction reason, the system comprising:
   a memory; and
   a processor configured to:
   a) select an interaction channel and interaction reason pair as an interaction subset within the series of interactions; wherein an interaction channel comprises a channel of communication representing one of a telephone call, SMS, IVR, chat, web interaction, mail, video and voice, and an interaction reason represents a reason for the interaction between a given user device and the contact center; and wherein an interaction series is created in preprocessing from multiple different databases, each storing interactions from a different interaction channel;
   b) set a working set of interaction series equal to the plurality of interaction series, and set a rating threshold equal to an initial rating threshold;
   c) for the interaction subset, determine, by interacting with a job server, if there is a set of interaction series among the working set of interaction series meeting a set of predefined conditions such that each interaction series in the set of interaction series comprises the interaction subset, an average rating of the interaction series in the set of interaction series is equal to or above the rating threshold and the set of interaction series includes at least a threshold number of interaction series;
   d) if no set of interaction series meets the conditions, then:
      select an interaction channel and interaction reason pair different from the last interaction channel and interaction reason pair in the interaction subset, and replace the last interaction channel and interaction reason pair in the interaction subset with the different interaction channel and interaction reason pair; and
      repeat operation c) using at least the different interaction channel and interaction reason pair; and
   e) if a set of interaction series meets the conditions, then:
      (i) select an additional interaction channel and interaction reason pair and add the additional interaction channel and interaction reason pair to the interaction subset as the last interaction channel and interaction reason pair in the interaction subset;
      (ii) set the working set of interaction series to be the set of interaction series;
      (iii) calculate a revised threshold for the rating threshold;
      (iv) repeat operations (i)-(iii) for at least a second additional interaction channel and interaction reason pair, until a predefined threshold is reached; and
      (v) after the predefined threshold is reached, return the interaction subset; and
   f) f) automatically send an alert to an analyst when a set of interaction series indicates a predefined behavior with respect to a given Key Performance Indicator (KPI).

11. The system of claim 10, wherein, when calculating a revised threshold for the rating threshold, the processor is further configured to set the rating threshold to be the average rating of the set of interaction series.

12. The system of claim 10, wherein the predefined threshold of operation e) is an iteration cycle limit; and
   wherein, when repeating operations (i)-(iii) for at least the second additional interaction channel and interaction reason pair, the processor is further configured to:
   iterate repeatedly until reaching the predefined iteration cycle limit; and
   after iterating reaches the predefined iteration cycle limit, return the interaction subset.

13. The system of claim 12, wherein selecting an interaction channel and interaction reason pair comprises selecting an interaction channel and interaction reason pair from a set, the method comprising reaching the predefined iteration cycle limit when: there are no more pairs to select from the set of interaction channel and interaction reason pairs; or the interaction subset includes more than a threshold number of pairs.

14. The system of claim 13, wherein the processor is configured to, if a set of interaction series meets the conditions, then:
   select an interaction channel and interaction reason pair other than the interaction channel and reason pair selected in operation e) and adding it to the interaction subset as the last interaction channel and interaction reason pair in the interaction subset; and
   perform operation b) using the interaction subset.

15. The system of claim 10, wherein selecting an interaction channel and interaction reason pair comprises selecting an interaction channel and interaction reason pair from a list of interaction channel and interaction reason pairs.

16. The system of claim 10, wherein the plurality of interaction series is ordered by rating, and wherein determining if there is a set of interaction series among the working set of interaction series meeting the conditions comprises starting with the interaction series having the highest rating.

17. The system of claim 10, wherein if a set of interaction series meets the conditions, setting the working set of interaction series to be the set of interaction series comprises setting the working set of interaction series to be the set of interaction series where each interaction series has a prefix up to the interaction channel and interaction reason pair added to the interaction subset as the last interaction channel and interaction reason pair removed.

18. The system of claim 10, wherein the processor is configured to provide to a user interaction series including the interaction subset.

19. A method for analyzing a plurality of journeys relating to interactions between user devices and a contact center, each journey having a rating and comprising a series of tuples, each tuple comprising an interaction method and an interaction reason, the method comprising:
   initializing, by a processor, data by setting a sequence to be an initial sequence, each sequence comprising one or more tuples, setting a working set of journeys, and initializing a rating threshold;
   for the sequence, determining, by the processor, interacting with a job server, if there is a set of journeys in the working set of journeys meeting a set of predefined conditions such that each journey includes the sequence,—an average rating of the journeys in the set of journeys meets the rating threshold; and the set of journeys includes at least a minimum number of journeys:
   if no set of journeys meets the conditions, then:
      replacing, by the processor, the last tuple in the sequence and repeating the determining step; and if a set of journeys meets the conditions, then:
- (i) adding by the processor, an additional tuple to the sequence; setting, by the processor, the working set of journeys to be the set of journeys;
- (ii) calculating, by the processor, a revised threshold for the rating thresholds;
- (iii) repeating, by the processor, operations (i) and (ii) for at least a second additional tuple, until a predefined threshold is reached; and
- (iv) after the predefined threshold is reached, returning, by the processor, the sequence; and automatically sending, by the processor, an alert to an analyst when a journey indicates a predefined behavior with respect to a given Key Performance Indicator (KPI);

wherein an interaction method comprises one of a telephone call, SMS, IVR, chat, web interaction, mail, video and voice, and an interaction reason comprises a reason for the interaction between a given user device and the contact center; and wherein a journey is created in preprocessing from multiple different databases, each storing interactions from a different interaction channel.

20. The method of claim 19, wherein if a set of journeys meets the conditions, setting the working set of journeys to be the set of journeys comprises setting the working set of journeys to be the set of journeys having a prefix up to the tuple added to the sequence removed.

21. The method of claim 19, wherein adding a tuple comprises selecting a tuple from a list of tuples.

* * * * *